Sept. 13, 1960 W. KOSTELEZKY 2,952,429
PARACHUTE AND METHOD OF MAKING SAME
Filed May 24, 1956 3 Sheets-Sheet 1
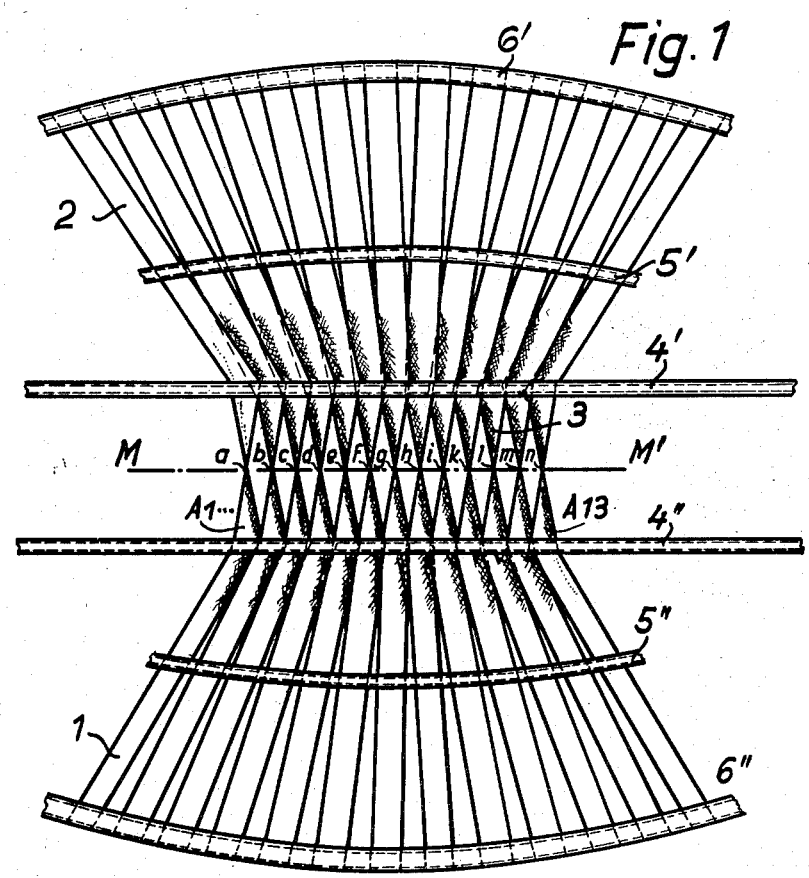
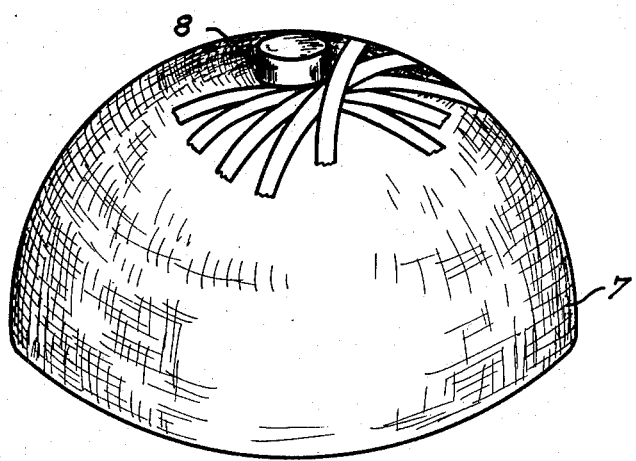
INVENTOR.
Walter Kostelezky
BY Sept. 13, 1960 W. KOSTELEZKY 2,952,429
PARACHUTE AND METHOD OF MAKING SAME
Filed May 24, 1956 3 Sheets-Sheet 3

INVENTOR.
WALTER KOSTELEZKY
BY

United States Patent Office 2,952,429
Patented Sept. 13, 1960

2,952,429
PARACHUTE AND METHOD OF MAKING SAME

Walter Kostelezky, Am Hallersberg 5, Weingarten, Wurttemberg, Germany

Filed May 24, 1956, Ser. No. 587,165

Claims priority, application Germany June 1, 1955

6 Claims. (Cl. 244—145)

The present invention concerns parachutes and, more particularly, relates to a method of making parachutes from ribbons, and to parachutes made according to this method.

Ribbon parachutes are also made in hemispherical shape. The heretofore known method of making such parachutes, however, requires considerable manual labor, which fact primarily accounts for the high cost of such parachutes.

It is, therefore, an object of the present invention to provide a method of making hemispherical parachutes from ribbons, which will considerably reduce manual labor, thereby simplifying and reducing the cost of making ribbon parachutes of the above mentioned type.

It is another object of this invention to provide a hemispherical ribbon parachute which is relatively very simple in construction while being very sturdy and efficient.

These and other objects and advantages of the invention will appear more clearly from the following specification in connection with the accompanying drawings, in which:

Fig. 1 illustrates a parachute according to the invention in its flat manufacturing state.

Fig. 5 shows a substantially semi-spherical form over which the ribbons or radials of the parachute structure may be passed for forming the canopy.

Figure 2:
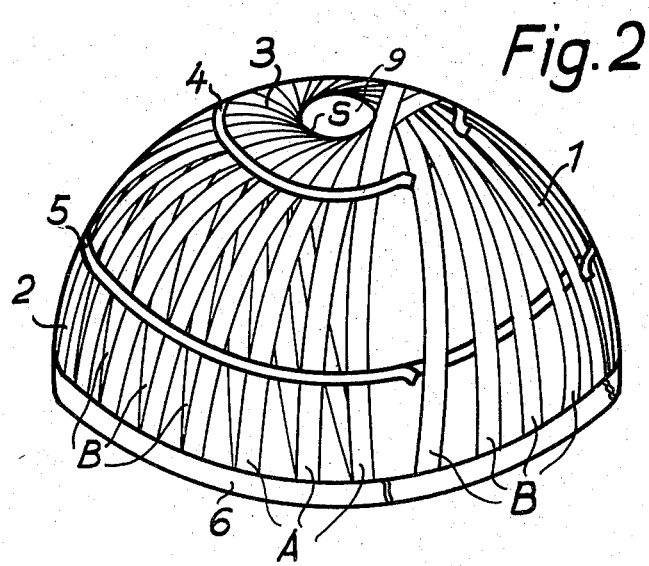
Fig. 2 is a perspective view of the completed parachute according to the invention, a portion of the outermost part of the parachute being broken out in order clearly to show the underlying or inner portion.

The method according to the present invention for making a hemispherical parachute from ribbons or ribbon-like material is characterized primarily by building up the parachute from ribbons as a flat structure with the ribbons at the center portion twisted by 180°, while the width of the said flat structure substantially equals the length of the radials, whereas the length of the flat parachute structure as measured along the outer edges corresponds substantially to the circumference of the lower lateral band. Only after this flat structure composed of ribbons has been produced, it is transformed into its hemispherical shape.

More specifically, the construction of the ribbon parachute according to the invention starts from a flat unit. In order to be able to make up the flat starting unit, it is, of course necessary first to determine the dimensions, i.e. width and length of said flat unit. These dimensions are naturally dependent on the diameter of the desired parachute, in other words, it is necessary for instance to know the size of a radial or load sustaining ribbon. The width of the flat unit is likewise determined by the diameter or the circumference of the desired parachute. If for instance the diameter for a personnel parachute is intended to be 6.2 meters the length at the lower canopy edge would be $2\pi r$ equaling 19.5 meters or round 20 meters. It is this length which is also to be given to the lower lateral webs 6', 6'' (see Fig. 1). These dimensions furnish the length of the plane starting unit. The ribbons 1 which form the load sustaining ribbons and may also be termed "radicals" are now placed individually and alongside each other upon the base web 6' and connected thereto for instance by tacking and are then at a certain angle passed to the web 5' and connected thereto for instance by tacking. The ribbons 1 are then at about the same angle passed to the web 4' and are also connected thereto.

The magnitude of the angle at which the individual ribbons pass from the base web 6' toward the web 4' is determined in a manner known per se from the weight, falling weight, quantity of air passing between the ribbons, and descending speed. These individual values, as mentioned, determine the magnitude of the above mentioned angle and have otherwise no influence upon the method according to the invention of composing the parachute.

After the individual load sustaining ribbons 1 have been connected with the web 4', the ribbons are twisted within the zone or area 3 (Fig. 1) by 180°. In view of this twist, the up to that time lower surfaces of the not yet connected ribbon halves will become the upper surfaces. This is clearly shown in Fig. 1 in zone 3 between the webs 4' and 4''. The said formerly lower surfaces of the ribbons are then sewed to the web 4'' so that the ribbons cannot change their positions any longer. From the web 4'' all individual ribbons are passed toward the outside again under the same angle as described in connection with the positioning of the ribbons between the webs 6' and 4'. Thus, a plane structure or unit is obtained which is symmetrical to the center line M—M' and to the axis transverse thereto.

Summarizing the situation described so far, it may be said that the plane parachute structure as shown in Fig. 1 is made up of single-piece ribbons or of ribbons composed of ribbon pieces sewn together or connected together in any other suitable manner. The width of this flat structure equals substantially the length of the radials 1 or load sustaining ribbons of the parachute to be made. The length of the flat structure of Fig. 1 corresponds substantially to the circumference of the lower lateral band 6' or 6''. The ribbons 1 forming the radials are crossed by webs 4', 4'', 5', 5'', 6' and 6'' which are respectively connected to the ribbons. As will be evident from the drawing, the webs 4' and 4'' are substantially parallel to each other, and similarly the webs 5' and 6' are substantially parallel to each other, and also the webs 5'' and 6'' are substantially parallel to each other.

The webs 4', 4'', 5', 5'' and 6', and 6'' which later with the completed parachute form the upper, intermediate, and lower lateral bands respectively, are symmetrically arranged with regard to the center line M—M' of the plane or flat structure of Fig. 1. All ribbons for forming the radials of the parachute cup are first arranged alongside each other and then by means of the webs are connected to each other in such a way that, with regard to Fig. 1, the outer portions of the ribbons, i.e. the portions adjacent the webs 6', 6'' are spaced from each other to a greater extent than the further inwardly located portions of the ribbons.

The section located intermediate the webs 4' and 4'' will later on form the vent section of the parachute.

Figure 3:
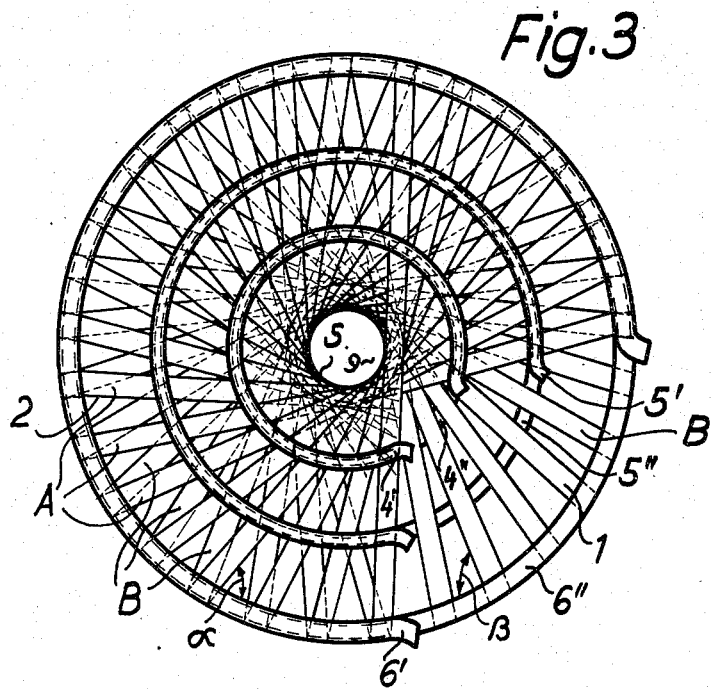
Fig. 3 is a top view of the parachute shown in Fig. 2, likewise with a top portion removed therefrom.
Figure 4:
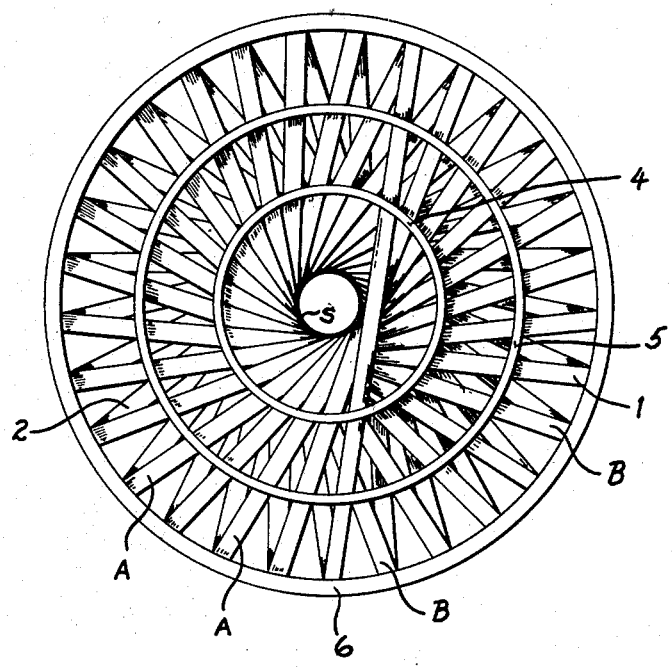
Fig. 4 represents a top view of the complete parachute canopy.

The transformation of the plane structure obtained in the manner set forth above into the desired spherical shape is preferably carried out on a semispherical form 7 (Fig. 5) the pole of which is provided with a cylindrical collar 8 having a diameter corresponding to the desired apex vent 9 (see Figs. 2 and 3). In order to effect this transformation of the plane structure into the hemispherical shape, first the ribbons in the central zone 3 which were twisted by 180° are again detwisted. In other words, the twist of these ribbons is undone so that all ribbon sections within zone 3 will be located in one plane, i.e. are not twisted any longer. The precise centers of the ribbon portions in zone 3 have prior to the detwisting been marked individually on the respective ribbon portions. These center points are designated with the letters $a$ to $n$ in Fig. 1. The detwisting of the ribbons in the center zone 3 is effected by turning that portion as a unit by 180° which is held together by the base web 6″. After in this way the ribbon portions in zone 3, i.e. between the webs 4′ and 4″ are not twisted any longer, the ribbon portion $A_1$ is placed at its center point $a$ along the cylindrical collar or templet 8 of the hemispherical form 7 in such a manner that the outer edge of the ribbon portion $A_1$ is tangential to the said collar or cylindrical templet. Thereupon the ribbon portion $A_2$ is placed in a tangential manner at its point $b$ against the cylindrical templet 8 so that the point $b$ will be precisely adjacent the point $a$ of the ribbon portion $A_1$. The thus placed ribbon portions $A_1$ and $A_2$ are now fixed to the templet by pins, tacking, or the like. Thereupon, the same procedure is repeated with the ribbon portions $A_3$ to $A_{13}$. The thus closely adjacent center points $a$ to $n$ then form an envelope the diameter of which corresponds to the desired apex vent 9. Thereupon, the thus placed ribbon portions $A_1$, $A_{13}$ are sewed together so as to permanently retain their respective positions. The arrangement of the remaining ribbon portions will then follow by itself, i.e. the two halves of the former plane starting structure will place themselves in form of two cups above each other in such a manner that the load sustaining ribbons 1, 2 will on one half of the hemispherical form be located on the outside and on the other half of the hemispherical form will be located on the inside of the parachute. The webs 4′, 4″ and 5′, 5″ and the base web 6′, 6″ are respectively arranged above each other inasmuch as the parachute has been built up precisely symmetrical. However, the respective superimposed webs will be located along their entire length on the outside and on the inside of the parachute respectively with the radials therebetween. In this way, the hemispherical shape of the ribbon parachute is obtained. The ribbons and webs are then firmly connected to each other for instance by sewing or gluing, or in case synthetic material is used by fusing or the like.

As will be evident from Figs. 2 and 3, two groups of ribbons 1, namely the groups A and B extend along major circles over the surface of a hemisphere.

The first group A has the inclination $\alpha$ (Fig. 3), whereas the second group B has the inclination $\beta$ with regard to the lower lateral web 6, the angle $\beta$ equalling 180° minus $\alpha$. Both groups A and B enclose a zenith circle S the radius of which depends on the angle of inclination $\alpha$. In other words, all ribbons 1 form tangents to the zenith circle S.

The lateral band or web 6 is composed of the webs 6′ and 6″. In completed condition of the parachute, the lateral band or web 6 actually is a double web produced by placing the webs 6′ and 6″ one on top of the other and interconnecting the same. This will be clearly evident from Fig. 3, particularly in connection with the forming of the canopy as set forth above. However, it is not necessary that the ends of the base webs 6′, 6″ abut each other. Each of the webs 6′, 6″ has respectively associated therewith and connected thereto one of the groups A and B. Each ribbon 1 forming an angle $\alpha$ with the lower lateral band 6 forms on the opposite side the angle 180° minus $\alpha$ with regard to the lower lateral band 6. In other words, each ribbon changes its relationship to its group at the zenith circle S. In a corresponding manner, the other webs 4, 5 are built up.

If the lower lateral web 6 or the lateral webs 4, 5 were cut in radial direction, the ribbon parachute could be laid out as a flat structure. From this fact it can be derived that vice versa, by the method according to the present invention, the hemispherical parachute can be produced from flat structures. The changing over of the ribbons from one group to the other group requires that the ribbons within the range of their intermediate sections must be twisted by 180°.

As will be clearly evident from Fig. 2, group A forms the outer portion or outer layer of the parachute, whereas the group B forms the inner portion or inner layer of the parachute.

It is, of course, to be understood that the present invention is, by no means, limited to the particular construction shown in the drawings but also comprises any modifications within the scope of the appended claims.

Thus, if desired, the starting flat structure for the parachute may be endless and this endless unit may then be cut into pieces corresponding to the respective length required for the desired parachute.

What I claim is:

1. An intermediate parachute canopy structure comprising two spaced substantially parallel non-endless webs, two curved non-endless webs having the ends thereof closer to said parallel webs than the portions between said ends, said curved webs respectively being arranged on opposite sides of the area confined by said two parallel webs and being spaced therefrom, and a plurality of ribbons extending from one of said curved webs to the other one of said curved webs while fanning from said parallel webs toward the respective adjacent curved webs, said ribbons being fastened to said parallel webs and to said curved webs and having substantially uniform width throughout their length.

2. A method of making a hemispherical parachute canopy from ribbons by means of a substantially hemispherical form, which includes the steps of: arranging the ribbons in one and the same plane with the central portions of said ribbons twisted by 180° and the adjacent portions of said ribbons fanning out toward opposite sides from said central portion, while securing the relative positions of said ribbons by webs extending substantially transverse to said ribbons and being connected thereto, thereby forming two structural portions forming an image of each other, untwisting the twisted portion of one of said structural portions and placing said one untwisted portion over said form by positioning the ribbons one after another about said form, placing the other structural unit over the structural portion now on said form by positioning the ribbons of said other structural portion one after another about said form, thereby producing two cups of substantially semispherical contour with the ribbons of said two cups crossing each other, and securing the thus obtained two cups in their respective position to each other.

3. A method of making a hemispherical parachute canopy with a vent from ribbons by means of a substantially hemispherical form, which includes the steps of: arranging the ribbons in a plane in close proximity to each other, confining the central portion of the thus laid out ribbons between two substantially parallel webs symmetrical to the dividing line of said ribbons extending transverse of said ribbons, fanning out those ribbon portions which are located on one side of one of said webs outside the area confined by said two webs, securing the positions of the thus fanned out ribbon portions by first additional webs spaced from the ribbon portions confined by said substantially parallel webs and also spaced from each other while connecting said first additional webs to said fanned out ribbon portions, turning the fanned out ribbon portions by 180° so as to produce twisting points along said dividing line, fanning out the ribbons of the other not yet fanned out ribbon portions and securing the same in their fanned out position by second additional webs having substantially the same spacing from said dividing line as said first additional webs, thereby obtaining two structural portions each comprising a twisted portion and a fanned out portion, each of said first and said second additional webs including a web interconnecting the outer ends of said fanned out ribbon portions and having a length reaching around said form, untwisting the twisted portion of one of said structural portions, placing one of said structural portions around said form by positioning the ribbons thereof one after another about said form along a circle having a diameter substantially equalling the diameter of the desired vent of the canopy to be made while locating said swisted points on said cycle, subsequently placing the other structural portion above the structural portion now on said form by positioning the ribbons of said other structural portion one after another about said form with the twisting points on said circle, thereby producing two substantially hemispherical cups with the ribbons of said cups crossing each other, and securing the thus formed two cups to each other by uniting the same along all of said webs.

4. A method of making a substantially hemispherical parachute canopy from ribbons by means of a substantially hemispherical form, which includes the steps of: arranging the ribbons in a plane with the central portions of said ribbons twisted by 180° and the adjacent portions of said ribbons fanning out, while securing the relative positions of said ribbons to thereby obtain a flat structural unit, untwisting the twisted portion of said unit, placing the ribbons of one side of that dividing line of said ribbons which extends transverse of said ribbons upon said form while positioning the ribbons of said one half one after another about said form, placing the second half of said ribbons over said first half by positioning the ribbons of said second half one after another about said form thereby producing two substantially hemispherical cups of closed contour with the ribbons of one cup crossing the ribbons of the other cup, and securing the two cups in their respective position to each other.

5. In a hemispherical ribbon parachute canopy with a vent at the top portion thereof: an inner substantially hemispherical cup, an outer substantially hemispherical cup superimposed upon said inner cup, each of said cups comprising a plurality of spaced circular web means decreasing in diameter in the direction from the bottom portion of said canopy toward the vent thereof, and also comprising a plurality of straight ribbons having substantially even widths throughout their lengths and extending from one portion of the respective largest web means tangentially to said vent to another portion of said respective largest web means so that in the vertical projection of said cups said ribbons form throughout straight tangential strips to said vent.

6. In a hemispherical ribbon parachute canopy with a vent at the top portion thereof: an inner substantially hemispherical cup, an outer substantially hemispherical cup superimposed upon said inner cup, each of said cups comprising a plurality of spaced circular web means decreasing in diameter in the direction from the bottom portion of said canopy to the vent thereof, and also comprising a plurality of ribbons having substantially even widths throughout their lengths and extending along a tangential plane to said vent and passing directly from one portion of the respective largest web means to said vent and to another portion of said respective largest web means so that in the vertical projection of said canopy said ribbons form throughout straight strips tangential to said vent, the outer end portions of each two ribbons respectively being connected to each other and to circumferentially spaced connecting points of said largest web means, each ribbon connected to one of said connecting points crossing with a ribbon connected to the adjacent one of said connecting points at a point on the web means nearest to said largest web means and being connected to said web means nearest said largest web means.

References Cited in the file of this patent

UNITED STATES PATENTS

| | | |
|---|---|---|
| 2,450,926 | Weinig | Oct. 12, 1948 |
| 2,465,409 | Weinig | Mar. 29, 1949 |